Jan. 16, 1945. W. L. DROWN 2,367,568
SENSING MECHANISM
Filed April 22, 1943 3 Sheets-Sheet 1

INVENTOR
William L. Drown

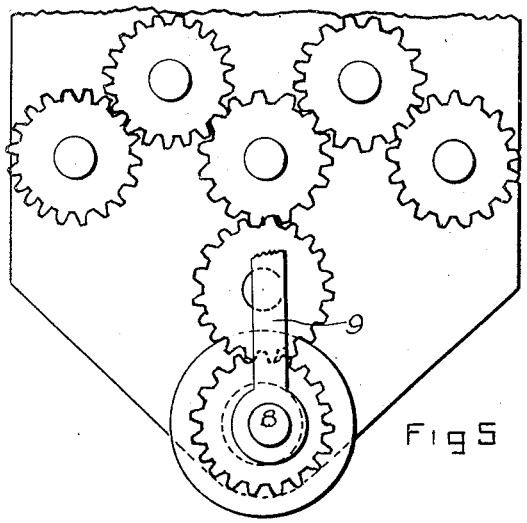
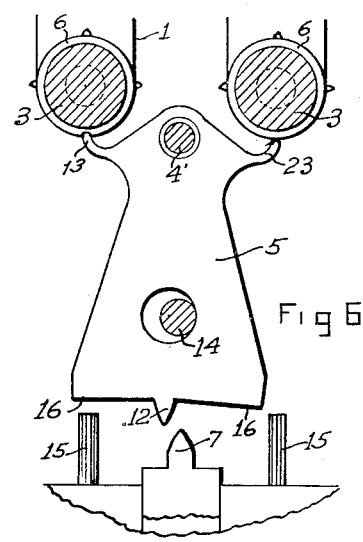
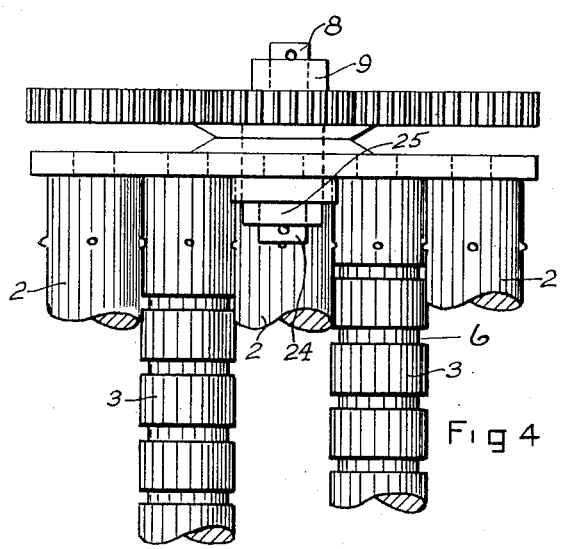
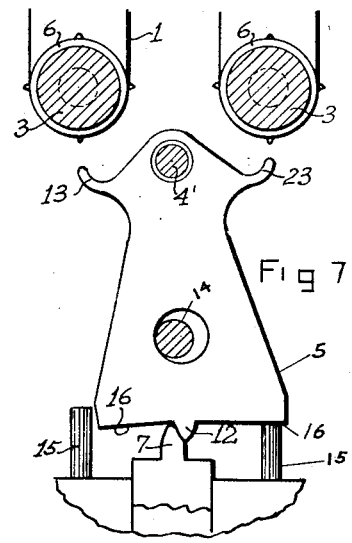
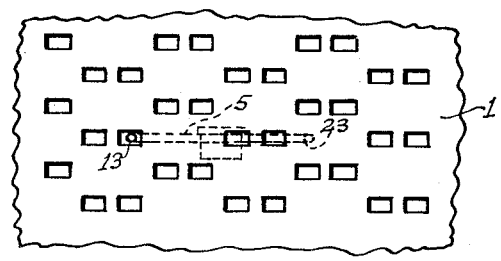

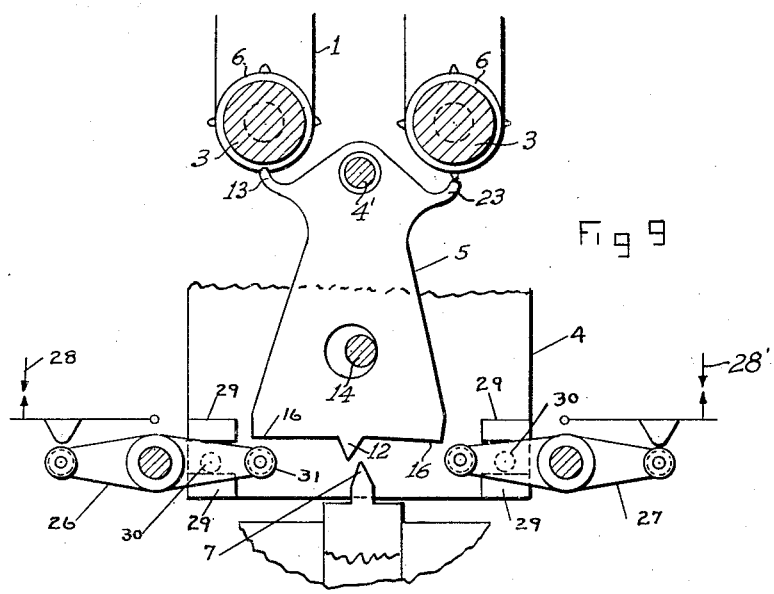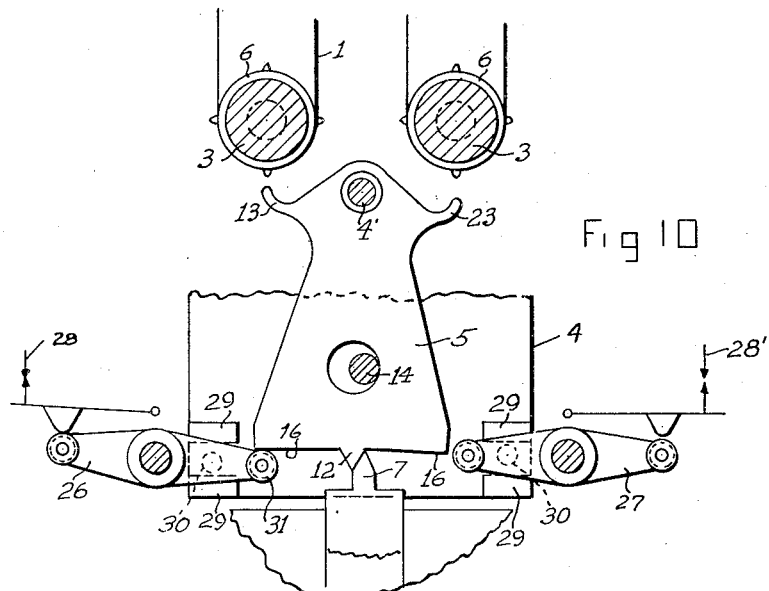

Patented Jan. 16, 1945

2,367,568

UNITED STATES PATENT OFFICE 2,367,568

SENSING MECHANISM

William L. Drown, Paxton, Mass.

Application April 22, 1943, Serial No. 484,115

15 Claims. (Cl. 164—114)

The present invention relates to sensing mechanism, and more particularly to a mechanism for controlling the movements of various types of machinery or operative devices, such as punches, electrically actuated apparatus, and the like, by means of selecting or sensing from a moving ribbon of perforated tape of suitable material.

It is one object of the invention to provide a sensing mechanism which will operate in a dependable manner at very high speeds.

It is a further object of the invention to provide a sensing mechanism which will include a locking device arranged to hold the parts positively in the correct positions as determined by the control tape.

It is a further object of the invention to provide a sensing mechanism which will cause a minimum of wear on the control tape.

With these and other objects in view, as will be apparent to those skilled in the art, the invention resides in the combination of parts set forth in the specification and covered by the claims appended hereto.

The various novel features of the invention are set forth in detail hereinafter, reference being made to the accompanying drawings, in which Fig. 1 is a front sectional elevation showing one arrangement of mechanism in accordance with the invention, the section being taken on the line 1—1 of Fig. 2;

Fig. 4 is a plan view of the feed rolls and sensing rolls or anvils;

Fig. 5 is a rear elevation of the top part of the device showing a possible arrangement of driving mechanism;

Fig. 6 is a fragmentary front elevation showing the sensing rocker in a different position;

Fig. 7 is a fragmentary front elevation with the sensing rocker shown in its extreme down position and illustrating the action of the lock and punching or switch actuating pins;

Fig. 8 is a plan view of another arrangement of sensing rocker and tape;

Fig. 9 is a fragmentary front elevation showing a slightly modified form of the invention; and Fig. 10 is a view similar to Fig. 9 but showing the sensing rocker in its lowermost position.

Like reference characters refer to like parts in the different figures.

Figure 3:
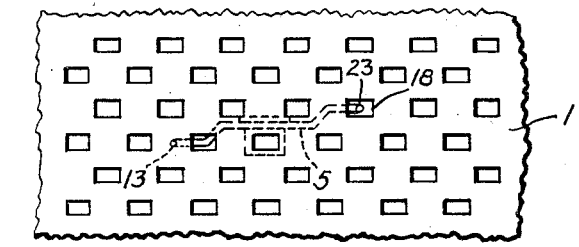
Fig. 3 is a plan view showing one arrangement and shape of the perforations or depressions in the control tape and of one form of sensing rocker.
Figure 1:
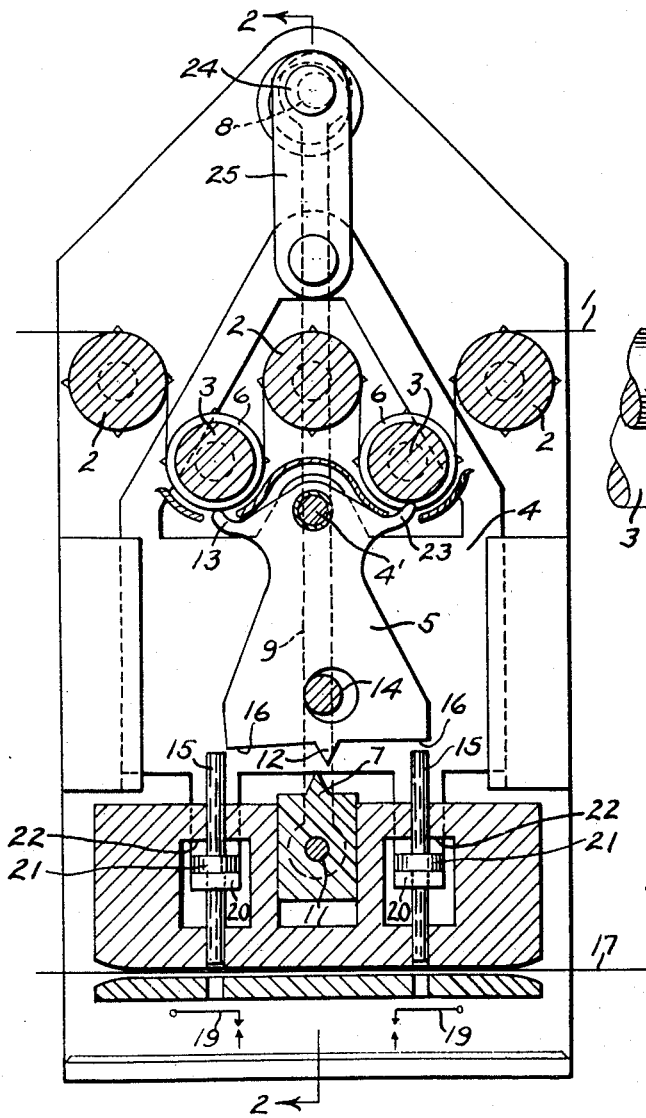
Figure 2:
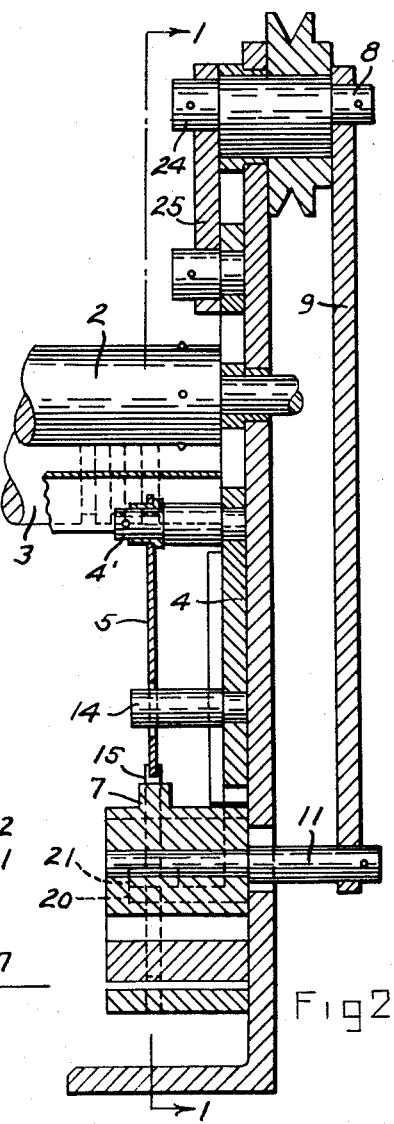
Fig. 2 is a section on the line 2—2 of Fig. 1.

As shown in Fig. 1 the tape 1 is fed intermittently or continuously over the sprocket feed rolls 2, 2, 2, and the sensing rolls or anvils 3, 3.

Slide 4, which carries a pin 4' forming a pivotal support for the sensing rocker 5, has imparted to it, by means of an eccentric 24 and link 25, a vertical reciprocating motion of a suitable amount.

As the slide 4 approaches the upward end of its movement the sensing rocker approaches the tape. According to the pattern of the tape or record one wing or finger 13 of the sensing rocker comes against an unperforated section of the tape. As will be readily understood the slide is moving upwards still, and inasmuch as the aforesaid wing 13 of the sensing rocker 5 can no longer advance upward because of the unperforated section of the tape, this imparts a rocking movement to the whole sensing rocker. This is clearly shown in Fig. 1.

Inasmuch as the other wing or finger 23 of the sensing rocker must be allowed to advance upward, the tape or record has a perforation or depression in it at this exact location. Also a groove or indentation 6 has been provided in the sensing roll or anvil 3.

The slide continues its upward motion until it reaches the top of its movement, and then starts its downward stroke. It will be readily understood that the sensing rocker is controlled and held in its rocked position by the tape until it reaches the same corresponding position on its downward stroke at which it met the tape on its upward stroke.

It will be understood that the sensing rocker after it passes this point on its downward stroke could then assume any other rocking position. This of course would be highly undesirable. In order to prevent this and to assure that it remains in the same rocked position that the tape imparted to it originally, a moving lock with an upwardly pointed lug has been provided.

This lock has been provided with a suitable means for moving it upwards and downwards positively, such as a cam or the eccentric 8 and the link 9 connected to said lock by means of the stud 11.

The lock 7 begins to move upward in time so that its point passes the point or lug 12 on the bottom of the sensing rocker 5 slightly before the wing 13 of the sensing rocker 5 leaves the tape.

Thus it will be seen that the sensing rocker 5 cannot change its rocked position but slightly. Slide 4 continues its downward movement and lock 7 continues its upward movement until they reach the limit of their strokes respectively. By this time the point 12 of the sensing rocker has assumed a fully locked position and sensing rocker 5 has met the limiting stop pin 14, as shown in Fig. 7. This action places the sensing rocker 5 in a definitely secure position, so that it cannot be rocked by the force necessary to move actuating pin 15.

The slide 4 now starts its upward movement and lock 7 moves downward. The timing of the lock 7 is such that before the wings of the sensing rocker again meet the tape, it has passed below the point 12 of the sensing rocker, and will thus allow the sensing rocker to change at will its rocked position, should the pattern of the tape so dictate. In other words, at the moment when one or the other of the wings makes contact with the tape, the lock 7 will be positioned slightly lower than the point 12, so that the rocker will be free to swing either to the right or to the left as required by the tape, without interference with the lock.

This completes one cycle of the sensing rocker and it will be readily seen that a very novel and simple means has been provided of causing a predetermined action of the sensing rocker 5 as selected by the pattern of the tape.

The action of the actuating pins is as follows:

It has been shown that the sensing rocker 5 has been caused to assume a desired rocked position on its upward stroke and has been secured in this position by the movable lock 7, and we now assume the sensing rocker 5 to be on its downward stroke. At the proper point on this downward stroke one of the shoulders 16 of the sensing rocker 5 meets one of the actuating pins 15, and causes it to move downwards until it assumes the position as shown in Fig. 7 at the end of the downward stroke.

The actuating pin 15 has by its downward movement caused a perforation to be punched in tape 17 (Fig. 1) which corresponds exactly in pattern to a corresponding perforation 18 in tape 1 (Fig. 1). Thus it will be seen that a new tape may be produced easily and exactly when desired. The actuating pins may also be used to close or open electrical contacts or switches 19 (Fig. 1). It will be readily seen that the action of the actuating pins becomes extremely useful and practical.

It will be clearly seen that some means must be provided to return the actuating pins positively to their upward or neutral position so that the perforated tape may move along by the pins to a new position, or that the contacts or switches may assume their original position.

These means have been provided as follows:

The abutments 20 on the slide 4 in Fig. 1 project under shoulder 21 of the actuating pins 15. These abutments 20 have a hole through them to allow actuating pins 15 to slide freely in the abutments.

As the slide 4 moves upward from its down position the abutments 20 force the actuating pins 15 to move to their up position.

The movements of the actuating pins 15 are limited in their upward movement to a correct position by the shoulder stop 22. Thus it will be seen that these actuating pins cannot rise high enough to interfere with the rocking action of the sensing rocker 5.

This completes the cycle of the actuating pins 15.

In the modified form of the invention shown in Figs. 9 and 10, the actuating pins have been replaced by a pair of switching levers 26 and 27 which are associated with electrical switches 28 and 28' respectively. The operation of this embodiment is as follows: assume the sensing rocker slide 4 to be in its up position with the sensing rocker rocked to the left.

The abutments 29 on the slide 4 have raised the switching levers 26 and 27 to their up or neutral position by means of contact with studs 30.

Shortly after the slide 4 starts its downward stroke it is locked by the moving lock 7. Immediately after this locking occurs one shoulder 16 of the sensing rocker comes in contact with the roll 31 on the switch lever 26, and as the slide 4 continues its downward stroke it rocks the lever 26 down and causes the switch 28 to close thereby closing an electrical circuit. Shortly after slide 4 starts its upward stroke the abutment 29 comes in contact with stud 30, and causes switch lever 26 to return to its neutral position. This completes the cycle of the switching levers. The switches 28 and 28' may of course control any desired electrically actuated apparatus.

From the foregoing description it will be seen that this device permits of a very rapid accurate cycle of operation and that furthermore due to almost complete absence of friction and due also to the fact that only one simple light rocking element is used, the force impressed on the tape to cause the sensing rocker to rock is very slight; this tending to prolong the life of the tape indefinitely.

It is of course understood that while only one sensing station is shown it would be desirable probably to add one or more sensing elements side by side to secure multiple sensing.

I claim:

1. In a device of the class described in combination with a perforated tape having holes of suitable design and shape, feeding means for the tape continuously and intermittently, means for actuating the slides of a sensing rocker having properly shaped wing ends to come in contact with or pass through the tape.

2. In a device of the class described in combination with a perforated tape, tape feeding means and slide actuating means of a sensing rocker having shoulders to come in contact with movable pins hereinafter called actuating pins.

3. In a device of the class described in combination with a moving perforated tape, movable slides, a sensing rocker having a locking point on its bottom extremity, actuating pins, movable lock and abutments of a roll or rolls hereinafter called anvil or anvils having annular grooves or suitable indentations in them for the purpose of allowing the rocking senser wings to pass through the tape.

4. A sensing mechanism adapted to respond to the pattern of a control tape comprising means to support the tape, a member movable toward and away from the said means, a rocker pivotally supported on the said member, a sensing finger on the rocker arranged to either engage the tape or to miss the same, dependent upon the pattern of the tape, as the member moves toward the said supporting means and thereby determine the position of the rocker relative to the said member, and two movable devices in position to be actuated selectively by the rocker.

5. A sensing mechanism adapted to respond to the pattern of a control tape comprising means to support the tape, a member movable toward and away from the said means, a rocker pivotally supported on the said member, a sensing finger on the rocker arranged to either engage the tape or to miss the same, dependent upon the pattern of the tape, as the member moves toward the said supporting means and thereby place the rocker in one or the other of two positions on the said member, and two movable devices so located that one or the other of them will be engaged and actuated by the rocker as the member moves away from the said means, dependent upon the position in which the rocker is placed.

6. A sensing mechanism adapted to respond to the pattern of a control tape comprising means to support the tape, a member movable toward and away from the said means, a rocker pivotally supported on the said member, a sensing finger on the rocker arranged to either engage the tape or to miss the same, dependent upon the pattern of the tape, as the member moves toward the said supporting means and thereby place the rocker in one or the other of two positions on the said member, a positively acting device arranged to lock the rocker in the position in which it has been placed by the action of the sensing finger, and two movable devices so located that one or the other of them will be engaged and actuated by the rocker as the member moves away from the said means, dependent upon the position in which the rocker is placed.

7. A sensing mechanism adapted to respond to the pattern of a control tape comprising means to support the tape, a member movable toward and away from the said means, a rocker pivotally supported on the said member, a pair of sensing fingers on the rocker so arranged that a selected one of the fingers, dependent upon the pattern of the tape, will engage the tape and the other finger will miss the same as the member moves toward the said supporting means and thereby swing the rocker to one side or the other of a central position, and a movable device in position to be either actuated or missed by the rocker, dependent upon which side of its central position the rocker may be, as the member moves away from the said means.

8. A sensing mechanism adapted to respond to the pattern of a control tape comprising means to support the tape, a member movable toward and away from the said means, a rocker pivotally supported on the said member, a pair of sensing fingers on the rocker so arranged that a selected one of the fingers, dependent upon the pattern of the tape, will engage the tape and the other finger will miss the same as the member moves toward the said supporting means and thereby swing the rocker to one side or the other of a central position, a positively acting device arranged to lock the rocker in the position in which it has been placed by the action of the sensing fingers, and a movable device so located that it will be engaged and actuated by the rocker as the member moves away from the said means, dependent upon the position in which the rocker is placed.

9. A sensing mechanism adapted to respond to the pattern of a control tape comprising means to support the tape, a member movable toward and away from the said means, a rocker pivotally supported on the said member, a pair of sensing fingers on the rocker so arranged that a selected one of the fingers, dependent upon the pattern of the tape, will engage the tape and the other finger will miss the same as the member moves toward the said supporting means and thereby swing the rocker to one side or the other of a central position, and two movable devices in position to be actuated selectively by the rocker, dependent upon which side of its central position it may be, as the member moves away from the said means.

10. A sensing mechanism adapted to respond to the pattern of a control tape comprising means to support the tape, a member movable toward and away from the said means, a rocker pivotally supported on the said member, a pair of sensing fingers on the rocker so arranged that a selected one of the fingers, dependent upon the pattern of the tape, will engage the tape and the other finger will miss the same as the members moves toward the said supporting means and thereby swing the rocker to one side or the other of a central position, and a positively acting locking device arranged to prevent the rocker from returning to its central position during movement of the member away from the said means.

11. A sensing mechanism adapted to respond to the pattern of a control tape comprising a pair of horizontally spaced anvils providing downwardly facing surfaces over which the tape travels successively, a vertically reciprocable slide beneath the anvils, a rocker pivotally connected to the slide and movable about its pivot to either side of a central position, a pair of sensing fingers projecting upwardly from opposite sides of the rocker in position to either engage or miss the tape, dependent upon the pattern thereof, as the slide moves upwardly and thereby swing the rocker to one side or the other of its central position, and two movable devices beneath the rocker and at opposite sides thereof in such position that one or the other of them will be engaged and actuated by the rocker as the slide moves downwardly.

12. A sensing mechanism adapted to respond to the pattern of a control tape comprising a pair of horizontally spaced anvils providing downwardly facing surfaces over which the tape travels successively, a vertically reciprocable slide beneath the anvils, a rocker pivotally connected near its upper end to the slide and tending to hang by gravity in a central position, a pair of sensing fingers projecting upwardly from opposite sides of the rocker in position to either engage or miss the tape, dependent upon the pattern thereof, as the slide moves upwardly and thereby swing the rocker to one side or the other of its central position, and two movable devices beneath the rocker and at opposite sides thereof in such positions that one or the other of them will be engaged and actuated by the rocker as the slide moves downwardly.

13. A sensing mechanism adapted to respond to the pattern of a control tape comprising means to support the tape, a member movable toward and away from the said means, a rocker pivotally supported on the said member, a lug on the rocker, a pair of sensing fingers on the rocker so arranged that a selected one of the fingers, dependent upon the pattern of the tape, will engage the tape and the other finger will miss the same as the member moves toward the said supporting means and thereby swing the rocker to one side or the other of a central position, a locking device, actuating means for the locking device arranged to move said device into overlapping relationship with the said lug as the member starts to move away from the tape supporting means, and a movable device in position to be either actuated or missed by the rocker, dependent upon which side of its central position the rocker may be, as the member continues its movement away from the tape supporting means.

14. A sensing mechanism adapted to respond to the pattern of a control tape comprising means to support the tape, a slide reciprocable toward and away from the said means, a rocker pivotally supported on the slide, a pointed lug on the rocker, a pair of sensing fingers on the rocker so arranged that a selected one of the fingers, dependent upon the pattern of the tape, will engage the tape and the other finger will miss the same as the member moves toward the said supporting means and thereby swing the rocker to one side or the other of a central position, a reciprocable locking device having a pointed lug, means to reciprocate the slide and the locking device in a timed relationship such that the locking device lug will clear the rocker lug as the slide approaches the tape supporting means and overlap the rocker lug as the slide moves away from the tape supporting means, and a movable device in position to be actuated or missed by the rocker, dependent upon which side of its central position the rocker may be, as the slide continues its movement away from the tape supporting means.

15. A sensing mechanism adapted to respond to the pattern of a control tape comprising a pair of horizontally spaced anvils providing downwardly facing surfaces over which the tape travels successively, a vertically reciprocable slide beneath the anvils, a rocker pivotally connected near its upper end to the slide and tending to hang by gravity in a central position, a pointed lug projecting downwardly from the lower end of the rocker, a pair of sensing fingers projecting upwardly from opposite sides of the rocker in position to either engage or miss the tape, dependent upon the pattern thereof, as the slide moves upwardly and thereby swing the rocker to one side or the other of its central position, a locking device reciprocable vertically beneath the rocker and having an upwardly projecting pointed lug, means to reciprocate the slide and the locking device in a timed relationship such that the locking device lug will clear the rocker lug as the slide moves upwardly and overlap the rocker lug as the slide moves downwardly, and a movable device in position to be actuated or missed by the rocker, dependent upon which side of its central position the rocker may be, as the slide continues its downward movement.

WILLIAM L. DROWN.